US007657268B2

(12) United States Patent
Oswal et al.

(10) Patent No.: US 7,657,268 B2
(45) Date of Patent: Feb. 2, 2010

(54) PREDICTING MOVEMENT OF A MOBILE NODE FROM A CURRENT ACCESS LOCATION TO NEXT ACCESS LOCATIONS

(75) Inventors: Anand K. Oswal, Sunnyvale, CA (US); John G. Waclawsky, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 11/277,799

(22) Filed: Mar. 29, 2006

(65) Prior Publication Data

US 2007/0230399 A1    Oct. 4, 2007

(51) Int. Cl.
*H04W 24/00* (2009.01)
(52) U.S. Cl. .................... 455/456.3; 455/436; 455/438; 455/440; 455/453; 455/422.1
(58) Field of Classification Search ................. 455/453, 455/456.1, 456.3, 422.1, 404.2; 370/229, 370/331, 234, 310, 328, 338
See application file for complete search history.

(56) References Cited

U.S. PATENT DOCUMENTS

| | | | | |
|---|---|---|---|---|
| 5,161,248 A | * | 11/1992 | Bertiger et al. | 455/17 |
| 5,956,644 A | * | 9/1999 | Miller et al. | 455/453 |
| 6,125,278 A | * | 9/2000 | Wieczorek et al. | 455/437 |
| 6,188,905 B1 | * | 2/2001 | Rudrapatna et al. | 455/452.2 |
| 6,385,454 B1 | * | 5/2002 | Bahl et al. | 455/450 |
| 6,567,665 B1 | * | 5/2003 | Kissee | 455/436 |
| 6,750,813 B2 | * | 6/2004 | Vargas-Hurlston et al. | 342/357.09 |
| 7,272,405 B2 | * | 9/2007 | Maillard | 455/456.5 |
| 2004/0043772 A1 | * | 3/2004 | Quirke et al. | 455/456.1 |
| 2004/0166854 A1 | * | 8/2004 | Longacre | 455/435.1 |
| 2004/0192313 A1 | * | 9/2004 | Otting | 455/446 |
| 2004/0192342 A1 | * | 9/2004 | Ranganathan | 455/456.1 |
| 2005/0003802 A1 | * | 1/2005 | Joseph | 455/414.1 |
| 2005/0043037 A1 | * | 2/2005 | Ioppe et al. | 455/456.1 |
| 2005/0272426 A1 | * | 12/2005 | Yang et al. | 455/436 |
| 2006/0025160 A1 | * | 2/2006 | Kodali et al. | 455/456.5 |
| 2006/0105781 A1 | * | 5/2006 | Ueda et al. | 455/456.1 |

OTHER PUBLICATIONS

"Technical Description on NEC's Broadband Wireless Access Products", NEC Corporation, http://w ww.neceurope.com/WIMAX/NEC_WiMAX_Whitepaper_051214.pdf, pp. 1-18, Dec. 2005.
"Building Next-Generation Wireless Network Infrastructure with Modular Building Blocks, Improving Competitiveness and Profitability in a Challenging Environment", White Paper, Wireless Overview, Intel Corporation, http://www.intel.com, pp. 1-12, printed Mar. 2006.
"Motorola Seamless Mobility Connectivity Architecture Overview", White Paper, Motorola, Inc., www.motorola.com/networkoperators, pp. 1-18, printed Mar. 2006.

* cited by examiner

*Primary Examiner*—Huy Q Phan
(74) *Attorney, Agent, or Firm*—Baker Botts L.L.P.

(57) ABSTRACT

Facilitating mobile node mobility includes facilitating at a current access location a communication session for a mobile node. Context information for the communication session is managed, where the context information comprises information for supporting the communication session. A predictive set comprising one or more predicted next access locations is established for the communication session. The context information is transferred to the predicted next access locations prior to the communication session moving to an actual next access location.

20 Claims, 2 Drawing Sheets

US 7,657,268 B2

PREDICTING MOVEMENT OF A MOBILE NODE FROM A CURRENT ACCESS LOCATION TO NEXT ACCESS LOCATIONS

TECHNICAL FIELD

This invention relates generally to the field of communications and more specifically to predicting movement of a mobile node from a current access location to next access locations.

BACKGROUND

A base station of a communication network may be used to establish a communication session for a mobile node. The mobile node may move to another location serviced by a different base station. Techniques are implemented to allow the next base station to continue to support the communication session in order to provide continuity of service.

Known techniques, however, are not efficient in certain situations. It is generally desirable to have efficient techniques in certain situations.

SUMMARY OF THE DISCLOSURE

In accordance with the present invention, disadvantages and problems associated with previous techniques for facilitating node mobility may be reduced or eliminated.

According to one embodiment of the present invention, facilitating mobile node mobility includes facilitating at a current access location a communication session for a mobile node. Context information for the communication session is managed, where the context information comprises information for supporting the communication session. A predictive set comprising one or more predicted next access locations is established for the communication session. The context information is transferred to the predicted next access locations prior to the communication session moving to an actual next access location.

Certain embodiments of the invention may provide one or more technical advantages. A technical advantage of one embodiment may be that a current access location may manage the context information for a communication session of a mobile node. The current access location may predict one or more next access locations to which the mobile node may move. Context information may be transferred to the one or more predicted next access locations prior to actual movement of the mobile node. Transferring context information prior to actual movement of the mobile node may minimize latency during handoff to the next access location.

Another technical advantage of one embodiment may be that the current access location may apply a load balancing operation to historical data describing the current access location. The current access location may generate a recommendation to balance the load at the next access locations.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
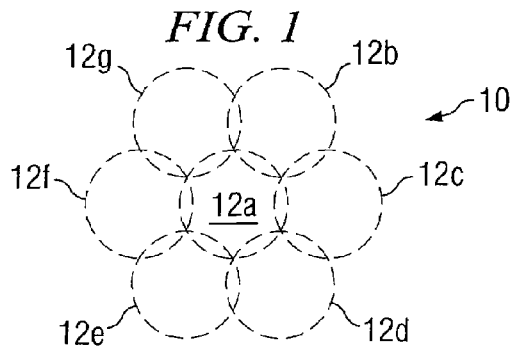
FIG. 1 is a diagram illustrating one embodiment of a neighborhood of cells through which a mobile node may move.

FIG. 1 is a diagram illustrating one embodiment of a neighborhood 10 of cells 12a-g through which a mobile node may move. A current access location of a cell 12 may manage the context information for a communication session for the mobile node, and may predict one or more next access locations to which the mobile node may move. Context information may be transferred to the predicted next access locations prior to actual movement of the mobile node. Transferring context information prior to actual movement of the mobile node may minimize latency during handoff to the next access location.

According to the illustrated embodiment, a cell 12 represents a geographic unit of a network attachment point of a communication network. As an example, cell 12 may represent a cell of a cellular network. As another example, cell 12 may represent a hot spot in a wireless network such as in an Institute of Electrical and Electronics Engineers, Inc. (IEEE) 802.11 Wi-Fi Alliance network or an IEEE 802.16 WiMAX Forum network. As yet another example, cell 12 may represent a geographic unit for a network of any suitable technology, for example digital subscriber line (DSL) or cable technology.

A cell 12 may have a cell identifier that uniquely identifies cell 12. A cell identifier of a cell 12 may comprise an address, for example, a medium access control (MAC) address or an IPvx such as IPv4 or IPv6 address for an access location of the cell 12.

A neighbor cell 12b-g of a cell 12a may refer to a physical or logical neighbor of cell 12a. A physical neighbor cell 12b-g of cell 12a may refer to a cell 12b-g that is geographically proximate to cell 12a. As an example, a physical neighbor cell 12b-g may be adjacent to or overlapping with cell 12a. As another example, a physical neighbor cell 12b-g may be one, two, . . . , n hops away from cell 12a, where n represents any suitable number, for example, $1 \leq n \leq 10$, such as $2 \leq n \leq 5$.

A logical neighbor cell 12b-g of cell 12a may refer to a cell 12b-g with which cell 12a performs repeated hand-offs. As an example, different network attachment points for which repetitive hand-offs are performed may be considered logical neighbor cells 12b-g. Neighboring cells 12 may use different technologies. For example, cell 12a may use wireless technology, and cell 12b may use wired technology.

A cell 12 may have any suitable number of neighboring cells 12. According to the illustrated embodiment, cell 12a has six neighboring cells 12b-g. A cell 12, however, may have more or fewer neighboring cells 12. A cell 12 may have any suitable shape. According to the illustrated embodiment, cell 12a has a substantially circular shape that is formed into a substantially hexagonal shape by neighboring cells 12b-g. A cell 12, however, may have another suitable shape.

According to one embodiment, a current access location of a cell 12 may manage the context information for a communication session of a mobile node, and may predict one or more next access locations to which the mobile node may move. Context information may be transferred to the predicted next access locations prior to actual movement of the mobile node. Transferring context information prior to actual movement of the mobile node may provide for more efficient handoff to the next access location. A system that may be used to predict movement of the mobile node is described in more detail with reference to FIG. 2.

Modifications, additions, or omissions may be made to neighborhood 10 without departing from the scope of the invention. Neighborhood 10 may include more, fewer, or other cells 12. Additionally, cells 12 may be arranged in any suitable manner without departing from the scope of the invention.

Figure 2:
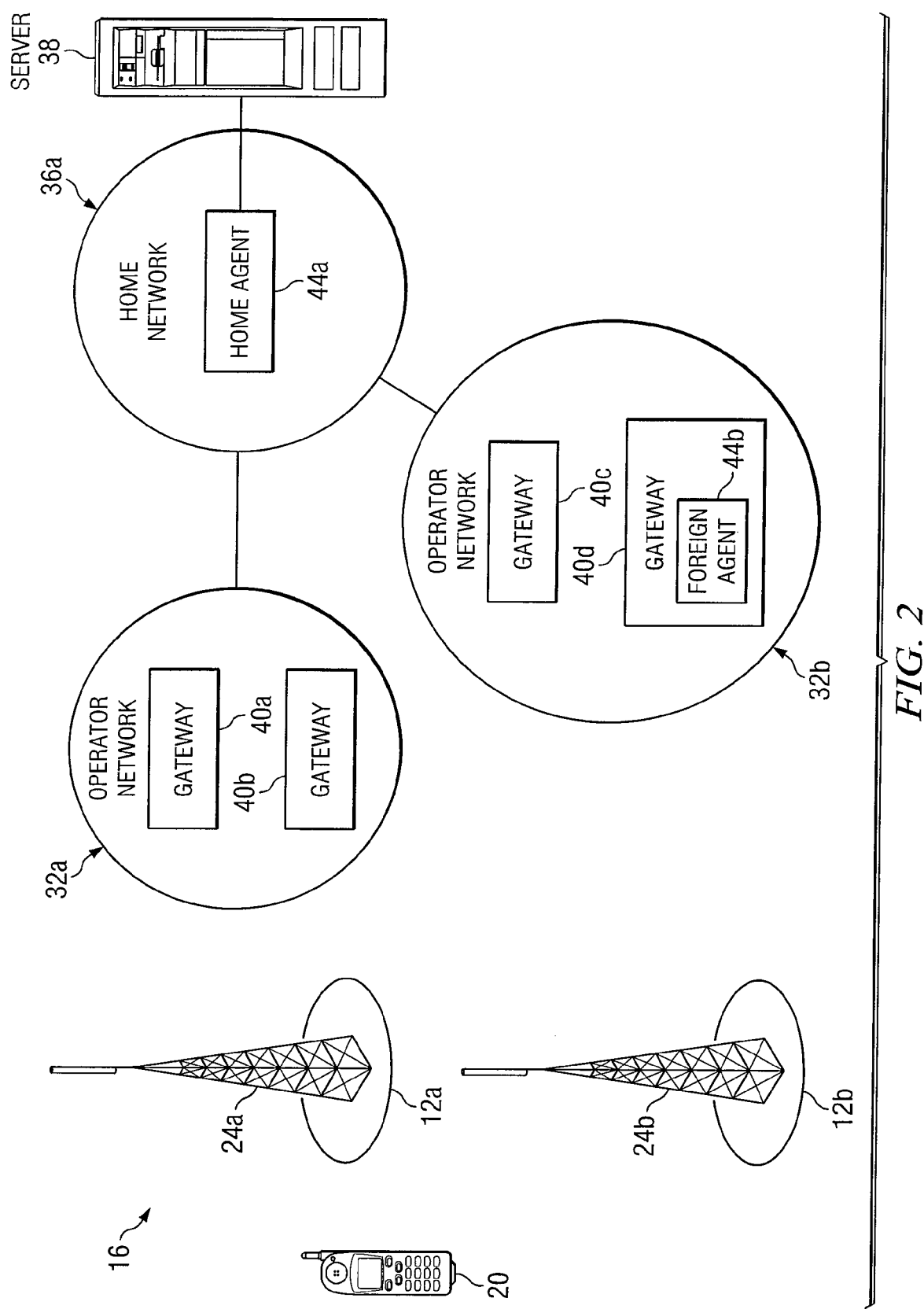
FIG. 2 is a block diagram illustrating one embodiment of a system operable to predict the movement of a mobile node from a current access location to a next access location.

FIG. 2 is a block diagram illustrating one embodiment of a system 16 operable to predict the movement of a mobile node from a current access location to a next access location in order to facilitate node mobility.

System 16 may operate to provide communication sessions, for endpoints such as mobile node 20. A communication session may refer to an active communication between endpoints, measured from endpoint to endpoint. Information is communicated between endpoints during a communication session. Information may refer to data, text, audio, video, multimedia, other suitable type of information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) or mobile IP may be used to communicate the packets.

System 16 may utilize digital cellular protocols and technologies to provide the communication sessions. Example digital cellular protocols and technologies include the Institute of Electrical and Electronics Engineers, Inc. (IEEE) 802.xx standards such as 802.11 standards, the Global System for Mobile communications (GSM) standards, the Universal Mobile Telecommunication System (UMTS) standards, the Code Division Multiple Access (CDMA) 2000 standards, the Internet Engineering Task Force (IETF) standards, or other standards.

System 16 includes components such as devices. In general, a device may include any suitable arrangement of components operable to perform the operations of the device, and may comprise logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 16 includes a mobile node 20, one or more base stations 24 of one or more cells 12, one or more operator networks 32, one or more networks 36, and a server 80 coupled as shown.

Mobile node 20 represents one or more devices operable to communicate with a communication system. Mobile node 20 may comprise, for example, a personal digital assistant, a computer such as a laptop, a cellular telephone, a mobile handset, or any other device operable to communicate with system 16.

A base station 24 represents one or more devices operable to provide mobile node 20 with wireless access to system 16. Base station 24 may include a base transceiver station and a base station controller. The base transceiver station communicates signals to and from mobile node 20, and the base station controller manages the operation of the base transceiver station. The wireless link between mobile node 20 and base station 30 is typically a radio frequency link.

A base station 24 may operate as an access location. An access location may refer to a point of a network that interconnects a wireless network to a wired network. According to one embodiment, the access location may have a context manager that manages context information for a communication session. Context information may refer to information that may be used to support a communication session for mobile node 20. For example, the context information may be used to support mobility and service delivery as mobile node 20 moves. The context information may be associated with a mobile node, a communication session, a user, or any other suitable identifier.

According to one embodiment, a context manager of a current access location may manage the context information for a communication session for mobile node 20, and may predict one or more next access locations to which mobile node 20 may move. Context information may be transferred to the predicted next access locations prior to actual movement of mobile node 20. Transferring context information prior to actual movement of mobile node 20 may provide for more efficient handoff to the next access location. An example context manager is described in more detail with reference to FIG. 3.

An operator network 32 represents a communication network that is operated by a specific operator, such as a mobile operator. A communication network may refer to a network that allows devices to communicate with each other. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Different operator networks may be operated by different operators, and may have no or only some overlapping components. Different operator networks 32a-b may operate according to different technologies. A technology may refer to processes and devices that operate according to a specific set of protocols, such as wireless, cable, optical, other wireline or wireless technology, or any combination of the preceding. Different technologies may refer to processes and devices that operate according to different protocols. For example, operator network 32a may be a wireless telephony operator, and operator network 32b may be a cable network operator.

An operator network 32 may include gateways 40 that allow mobile node 20 to communicate with server 38. According to the illustrated embodiment, operator network 32a includes gateways 40a-b, and operator network 32b includes gateways 40c-d. A gateway 40 may represent one or more devices operable to interconnect networks. Gateway 40 may be used to convert communications between different communication protocols. For example, gateway 40 may convert communications from the protocol of a network 32 to any of various other protocols that may be used by a network 36. According to one embodiment, gateway 40 may comprise an access server network (ASN) gateway. Gateway 40d includes a foreign agent 44b A home network 36 comprises a communication network that includes a home agent 44. A home agent of a mobile node may refer to an agent that maintains the address of the mobile node and forwards packets to the mobile node. According to one embodiment, home agent 44a may also instruct a current access location to transfer context information to a next access location. A foreign agent of a mobile node may refer to an agent that provides the home agent of the mobile node with an address to which data for the mobile node may be forwarded.

If mobile node 20 is in an area serviced by home agent 44a, home agent 44a forwards traffic to the location address of mobile node 20. If mobile node 20 moves to an area serviced by a foreign agent 44b, foreign agent 44b notifies home agent 44a that mobile node 20 has moved, and sends a forwarding address for mobile node 20 to home agent 44a. Home agent 44a forwards packets to the forwarding address.

Server 38 provides functionality requested by mobile node 20. Functionality may include providing a telephony service, providing information, other functionality, or any combination of the preceding. Telephony service may refer to any suitable service provided during a communication session.

Modifications, additions, or omissions may be made to system 16 without departing from the scope of the invention. The components of system 16 may be integrated or separated according to particular needs. Moreover, the operations of system 16 may be performed by more, fewer, or other modules. Additionally, operations of system 16 may be performed using any suitable logic. As used in this document, "each" refers to each member of a set or each member of a subset of a set.

Figure 3:
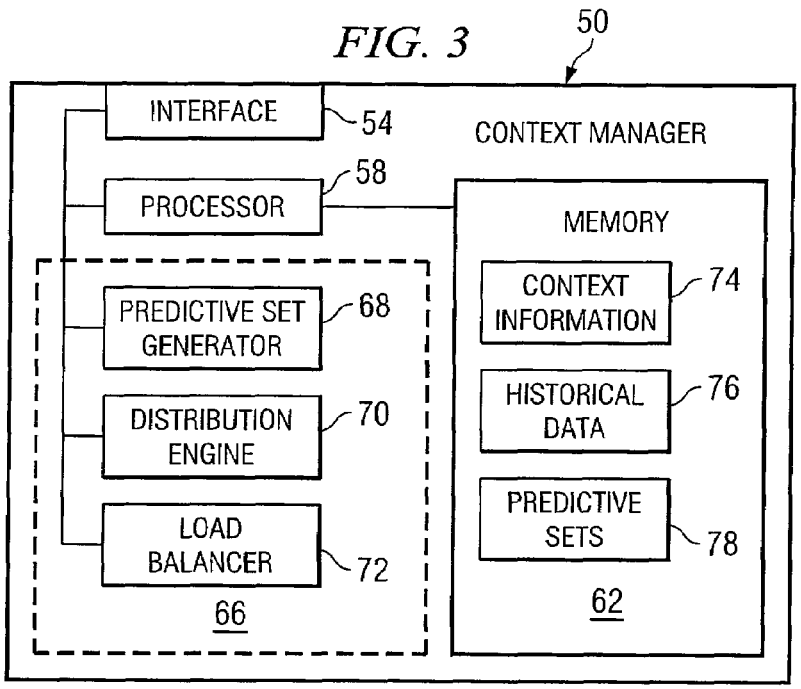
FIG. 3 is a block diagram illustrating one embodiment of a context manager that may be used with the system of FIG. 2.

FIG. 3 is a block diagram illustrating one embodiment of a context manager 50 that may be used with system 16 of FIG. 2. For purposes of illustration, context manager 50 is assumed to be located at base station 24a. According to the illustrated embodiment, context manager 50 includes an interface (IF) 54, a processor 58, a memory 62, and one or more applications 66 coupled as shown. Interface 54, processor 58, and memory 62 may be as described with reference to FIG. 2.

According to the illustrated embodiment, memory 62 stores context information 74, historical data 76, and predictive sets 78. Context information 74 may include any suitable information that may be used to support a communication session for mobile node 20. For example, context information may include security information, technology identification, mobility information, billing information, service information, a user profile, cache information, other suitable information for supporting a communication session, or any combination of the preceding.

Security information may refer to information used to establish the access allowed to mobile node 20. As an example, security information may include the security credentials of mobile node 20. As another example, security information may include authorization tokens granted by application servers. Security information may be transferred by directly transferring the security credentials from a current access location to a next access location. Security information may also be transferred by deriving keys at the next access location based on credentials sent from the current access location.

Technology identification may refer to an identification of the technology used by mobile node 20. The technology identification may allow operator networks 32 of disparate technologies to determine the type of technology to provide to mobile node 20.

Mobility information may refer to information used to transfer a communication session to a next operator network 32. As an example, a mobile node may receive service from a mobile wireless network. The mobile node may move, and then have the option of receiving service from a cable network or a wireless local area network. The mobile node may select the cable network, and have the session context information transferred from mobile wireless network to the cable network.

Billing information may refer to information used to assess a cost for a communication session. For example, a server such as an authentication, authorization, and accounting (AAA) server may generate billing records for the session. The billing records may be generated by any suitable accounting system, such as a Remote Authentication Dial-In User Service (RADIUS) system or a Diameter system, and may be correlated or exchanged by AAA hierarchical model entities, such as an AAA broker.

Service profiles may refer to information used to provide services during the communication session. For example, service profiles may include one or more qualities of service for mobile node 20. Mobile node 20 may have different qualities of service for different sessions. For example, mobile node 20 may have different qualities of service for a first session for downloading a data file, a second session for making a voice call over an IP network, and a third session for video streaming.

Historical data 76 describes previous conditions that may be used to predict access locations to which mobile node 20 may move. According to one embodiment, historical data 76 may describe previous conditions of a particular mobile node 20. Next access locations to be visited by the mobile node 20 may be predicted based upon past access locations visited by the mobile node 20. For example, mobile node 20 may be traveling in a vehicle.

The next access locations may be predicted based upon the path of access locations visited by mobile node 20 and the speed at which mobile node 20 is traveling.

According to another embodiment, historical data 76 may describe previous conditions at a current access location. Next access locations may be predicted based on mobile nodes 20 that have visited the current access location in the past. For example, historical data 76 may describe the usage at a next access location given a current access location and zero, one, or more previous access locations. Historical data 76 may indicate that mobile nodes 20 have a higher probability of moving to particular access locations after visiting the current access location.

As an example, historical data 76 may describe previous conditions at an access location comprising a base station. For a current base station $B_c$, usage u of a next base station $B_n$, given a previous base station $B_p$, may be expressed by the triplet $H(B_c)$:

$$H(B_c) = <B_p, B_n, u>$$

Previous base station $B_p$ refers to the base station from which mobile node 20 has moved. Previous base station $B_p$ may have a null value if mobile node 20 starts a communication session at current base station $B_c$. Next base station $B_n$ refers to a base station to which mobile node could move. Next base station $B_n$ may have a null value if mobile node 20 terminates a communication session at current base station $B_c$.

Usage u may be calculated from usage at current base station $B_c$, and may be updated at any suitable time. For example, the usage value may be updated as mobile node 20 roams to or from current base station $B_c$, begins a communication session at current base station $B_c$, or terminates a communication session at current base station $B_c$.

According to one example, historical data 76 includes triplets $H(B_c)$ for a current base station $B_c$ that describe usage u for next base station $B_n$, given a previous base station $B_p$, where next base station $B_n$ and previous base station $B_p$ are selected from $\{B_1, B_2, B_3\}$.

Usage u for next base station $B_n$ selected from $\{B_1, B_2, B_3\}$, given previous base station $B_1$ may be given by:

<$B_1,B_2,60\%$>
<$B_1,B_3,25\%$>
<$B_1,B_1,10\%$>
<$B_1,$null$,5\%$>

Usage u for next base station $B_n$ selected from $\{B_1, B_2, B_3\}$, given no previous base station $B_p$ may be given by:

<null,$B_2,10\%$>
<null,$B_3,75\%$>
<null,$B_1,10\%$>
<null,null,$10\%$>

Usage u for next base station $B_n$ selected from $\{B_1, B_2, B_3\}$, given previous base station $B_2$ may be given by:

<$B_2,B_2,40\%$>
<$B_2,B_3,25\%$>
<$B_2,B_1,10\%$>
<$B_2,$null$,25\%$>

Usage u for next base station $B_n$ selected from $\{B_1, B_2, B_3\}$, given previous base station $B_3$ may be given by:

<$B_3,B_2,25\%$>
<$B_3,B_3,25\%$>
<$B_3,B_1,15\%$>
<$B_3,$null$,35\%$>

Predictive sets 78 include one or more sets of next access locations to which a mobile node 20 at the current access location is predicted to move. According to one embodiment, predictive sets 78 may be predetermined and stored at memory 62. According to another embodiment, predictive sets 78 may be dynamically generated by predictive set generator 68 and stored at memory 62.

Applications 66 may include software operable to generate predictive sets that include predicted next access locations, and to distribute context information 74 to the predicted next access locations. According to the illustrated embodiment, applications 66 include a predictive set generator 68, a distribution engine 70, and a load balancer 72.

Predictive set generator 68 predicts next access locations to which mobile node 20 may move, and generates a predictive set that includes the predicted next access locations. The next access locations may be predicted in accordance with historical data 76. For example, next access locations may be predicted in accordance with the example triplets $H(B_c)$ presented above.

Predictive sets may include any suitable next access locations. Predictive sets may include the one, two, three, or more most likely next access locations. For example, predictive sets may include the one, two, three, or more next access locations with the highest usages.

Predictive sets for mobile node 20 may be selected in accordance with the quality of service of mobile node 20. For example, the number of access locations may be adjusted in accordance with the quality of service. A mobile node 20 with a higher quality of service may have a predictive set with more access locations than a predictive set for a mobile node 20 with a lower quality of service. As an example, a mobile node with a higher quality of service may have context transferred to all neighboring access locations, while a mobile node 20 with a lower quality of service may have the context transferred to only the most likely access location.

Distribution engine 70 distributes context information 74 to access locations of predictive sets. According to one embodiment, distribution engine 70 may distribute context information 74 by multicasting context information 74. Context information 74 may be multicast by designating a set of access locations that are to receive context information 74 by placing the addresses for the access locations in a multicast group.

Load balancer 72 may apply a load balancing operation to historical data 76 to generate a recommendation for balancing the load at the access locations. As an example, load balancer 72 may apply a load balancing operation to example triplets $H(B_c)$, and determine that base station $B_2$ receives more mobile nodes 20 than base stations $B_1$ and $B_3$. Load balancer 72 may send a recommendation to mobile node 20 that mobile node 20 should attach to less frequented base stations $B_1$ and $B_3$ instead of more frequented base station $B_2$.

Modifications, additions, or omissions may be made to context manager 50 without departing from the scope of the invention. The components of context manager 50 may be integrated or separated according to particular needs. Moreover, the operations of context manager 50 may be performed by more, fewer, or other modules. Additionally, operations of context manager 50 may be performed using any suitable logic.

Figure 4:
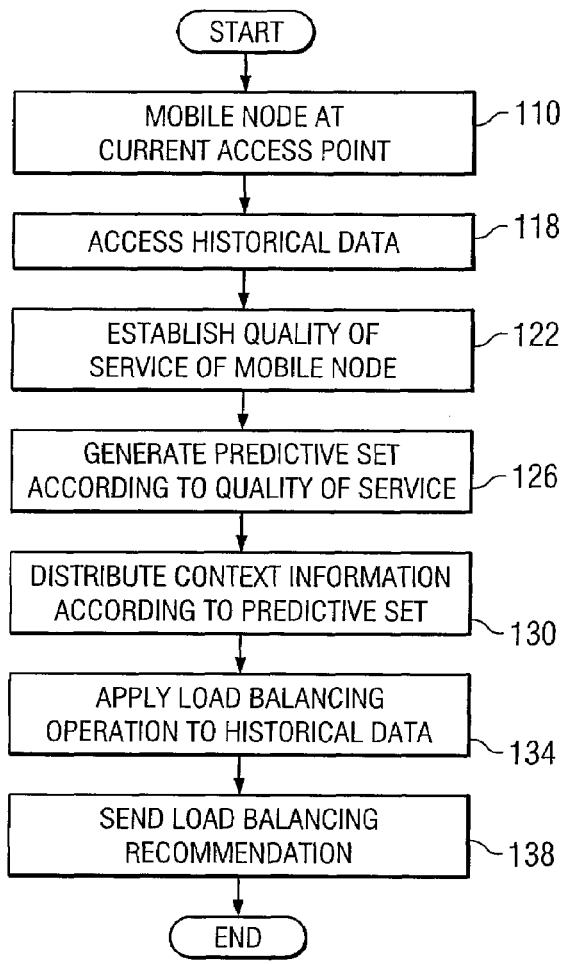
FIG. 4 is a flowchart illustrating one embodiment of a method for predicting the movement of a mobile node from a current access location to a next access location.

FIG. 4 is a flowchart illustrating one embodiment of a method for predicting the movement of a mobile node from a current access location to a next access location in order to facilitate node mobility.

The method begins at step 110, where mobile node 20 is at a current access location of a cell 12 of neighborhood 10. Historical data 76 is accessed at step 118. Historical data 76 may describe usage at next access locations given the current access location and one or more previous access locations of mobile node 20.

The quality of service of mobile node 20 is established at step 122. A predictive set of next access locations is generated at step 126 in accordance with the quality of service of mobile node 20. For example, one or more most probable next access locations, given the current access location and the previous access location of mobile node 20, may be established. A mobile node 20 with a higher quality of service may have a predictive set that includes more next access locations than a predictive set of a mobile node 20 with a lower quality of service.

Step 126 may be performed at any suitable time. For example, step 126 may be performed periodically, such as once an hour or once a day, or may be performed in response to an action, such as in response to the arrival of a certain number of mobile nodes 20.

Context information for mobile node 20 is distributed to next access locations of the predictive set at step 130. The context information is distributed prior to movement of mobile node 20, which may reduce latency of the hand off between the current access location and the next access location.

A load balancing operation is applied to historical data 76 to generate a load balancing recommendation at step 134. Load balancer 72 may apply a load balancing operation to balance the load at the next access locations. The load balancing recommendation is sent at step 138. Load balancer 72 may send the recommendation to mobile node 20. After sending the recommendation, the method terminates.

Modifications, additions, or omissions may be made to the method without departing from the scope of the invention. For example, load balancing need not be performed. The method may include more, fewer, or other steps. Additionally, steps may be performed in any suitable order without departing from the scope of the invention.

Certain embodiments of the invention may provide one or more technical advantages. A technical advantage of one embodiment may be that a current access location may manage the context information for a communication session of a mobile node. The current access location may predict one or more next access locations to which the mobile node may move. Context information may be transferred to the predicted next access locations prior to actual movement of the mobile node. Transferring context information prior to actual movement of the mobile node may minimize latency during handoff to the next access location.

Another technical advantage of one embodiment may be that the current access location may apply a load balancing operation to historical data describing the current access location. The current access location may generate a recommendation to balance the load at the next access locations.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for facilitating, by a context manager comprising hardware, mobile node mobility, comprising:
   facilitating at a current access location a communication session for a mobile node;
   managing context information for the communication session, the context information comprising information for supporting the communication session;
   accessing historical data describing previous conditions at the current access location, the historical data describing usage at a next access location of a plurality of access locations given the current location;
   establishing a predictive set for the mobile node, according to the historical data of a plurality of previous mobile that visited the current access location in the past, the predictive set comprising one or more predicted next access locations for the communication session; and
   transferring the context information to the one or more predicted next access locations prior to the communication session moving to an actual next access location.

2. The method of claim 1, wherein establishing the predictive set for the mobile node further comprises:
   selecting the one or more next access locations from the plurality of access locations according to the historical data.

3. The method of claim 1, wherein establishing the predictive set for the mobile node further comprises:
   selecting from the plurality of access locations one or more next access locations with higher usage as the one or more predicted next access locations.

4. The method of claim 1, wherein establishin2 the predictive set for the mobile node further comprises:
   determining a quality of service associated with the mobile node; and
   establishing the predictive set in accordance with the quality of service, a higher quality of service yielding more predicted next access locations than a lower quality of service.

5. The method of claim 1, further comprising:
   applying a load balancing operation to the historical data to generate a recommendation to balance the load of a plurality of access locations comprising the one or more predicted next access locations.

6. The method of claim 1, further comprising applying a load balancing operation to the historical data by:
   establishing a first usage of a first next access location of a plurality of access locations, the plurality of access locations comprising the one or more predicted next access locations;
   establishing a second usage of a second next access location of the plurality of access locations, the second usage less than the first usage; and
   generating a recommendation to attach the mobile node to the second next access location.

7. A system for facilitating mobile node mobility, comprising:
   a memory operable to store context information comprising information for supporting a communication session for a mobile node; and
   a processor coupled to the memory and operable to:
      facilitate the communication session for the mobile node;
      manage the context information for the communication session;
      access historical data describing previous conditions at the current access location, the historical data describing usage at a next access location of a plurality of access locations given the current location;
      establish a predictive set for the mobile node, according to the historical data of a plurality of previous mobile nodes that visited the current access location in the past, the predictive set comprising one or more predicted next access locations for the communication session; and
      transfer the context information to the one or more predicted next access locations prior to the communication session moving to an actual next access location.

8. The system of claim 7, the processor operable to establish the predictive set for the mobile node by:
   selecting the one or more next access locations from the plurality of access locations according to the historical data.

9. The system of claim 7, the processor operable to establish the predictive set for the mobile node by:
   selecting from the plurality of access locations one or more next access locations with higher usage as the one or more predicted next access locations.

10. The system of claim 7, the processor operable to establish the predictive set for the mobile node by:
    determining a quality of service associated with the mobile node; and
    establishing the predictive set in accordance with the quality of service, a higher quality of service yielding more predicted next access locations than a lower quality of service.

11. The system of claim 7, the processor further operable to:
    apply a load balancing operation to the historical data to generate a recommendation to balance the load of a plurality of access locations comprising the one or more predicted next access locations.

12. The system of claim 7, the processor further operable to apply a load balancing operation to the historical data by:
   establishing a first usage of a first next access location of a plurality of access locations, the plurality of access locations comprising the one or more predicted next access locations;
   establishing a second usage of a second next access location of the plurality of access locations, the second usage less than the first usage; and
   generating a recommendation to attach the mobile node to the second next access location.

13. A computer-readable medium storing logic configured for facilitating mobile node mobility, the logic operable to:
   facilitate at a current access location a communication session for a mobile node;
   manage context information for the communication session, the context information comprising information for supporting the communication session;
   access historical data describing previous conditions at the current access location, the historical data describing usage at a next access location of a plurality of access locations given the current location;
   establish a predictive set for the mobile node, according to the historical data of a plurality of previous mobile nodes that visited the current access location in the past, the predictive set comprising one or more predicted next access locations for the communication session; and
   transfer the context information to the one or more predicted next access locations prior to the communication session moving to an actual next access location.

14. The computer-readable medium of claim 13, further operable to establish the predictive set for the mobile node by:
   selecting the one or more next access locations from the plurality of access locations according to the historical data.

15. The computer-readable medium of claim 13, further operable to establish the predictive set for the mobile node by:
   selecting from the plurality of access locations one or more next access locations with higher usage as the one or more predicted next access locations.

16. The computer-readable medium of claim 13, further operable to establish the predictive set for the mobile node by:
   determining a quality of service associated with the mobile node; and
   establishing the predictive set in accordance with the quality of service, a higher quality of service yielding more predicted next access locations than a lower quality of service.

17. The computer-readable medium of claim 13, further operable to:
   apply a load balancing operation to the historical data to generate a recommendation to balance the load of a plurality of access locations comprising the one or more predicted next access locations.

18. The computer-readable medium of claim 13, further operable to apply a load balancing operation to the historical data by:
   establishing a first usage of a first next access location of a plurality of access locations, the plurality of access locations comprising the one or more predicted next access locations;
   establishing a second usage of a second next access location of the plurality of access locations, the second usage less than the first usage; and
   generating a recommendation to attach the mobile node to the second next access location.

19. A system for facilitating mobile node mobility, comprising:
   means for facilitating at a current access location a communication session for a mobile node;
   means for managing context information for the communication session, the context information comprising information for supporting the communication session;
   means for accessing historical data describing conditions at the current access location, the historical data describing previous usage at a next access location of a plurality of access locations given the current location;
   means for establishing a predictive set for the mobile node, according to the historical data of a plurality of previous mobile nodes that visited the current access location in the past, the predictive set comprising one or more predicted next access locations for the communication session; and
   means for transferring the context information to the one or more predicted next access locations prior to the communication session moving to an actual next access location.

20. A method for facilitating, by a context manager comprising hardware, mobile node mobility, comprising:
   facilitating at a current access location a communication session for a mobile node;
   managing context information for the communication session, the context information comprising information for supporting the communication session;
   accessing historical data describing previous conditions at the current access location, the historical data describing usage at a next access location of a plurality of access locations given the current location;
   establishing a predictive set for the mobile node, according to the historical data of a plurality of previous mobile nodes that visited the current access location in the past, the predictive set comprising one or more predicted next access locations for the communication session by:
      selecting from the plurality of access locations one or more next access locations with higher usage;
      determining a quality of service associated with the mobile node; and
      establishing the predictive set in accordance with the quality of service, a higher quality of service yielding more predicted next access locations than a lower quality of service;
   transferring the context information to the one or more predicted next access locations prior to the communication session moving to an actual next access location; and
   applying a load balancing operation to the historical data by:
      establishing a first usage of a first next access location of a plurality of access locations, the plurality of access locations comprising the one or more predicted next access locations;
      establishing a second usage of a second next access location of the plurality of access locations, the second usage less than the first usage; and
      generating a recommendation to attach the mobile node to the second next access location.

* * * * *

UNITED STATES PATENT AND TRADEMARK OFFICE
CERTIFICATE OF CORRECTION

PATENT NO. : 7,657,268 B2
APPLICATION NO. : 11/277799
DATED : February 2, 2010
INVENTOR(S) : Oswal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 541 days.

Signed and Sealed this

Thirtieth Day of November, 2010

David J. Kappos
*Director of the United States Patent and Trademark Office*